2,890,898

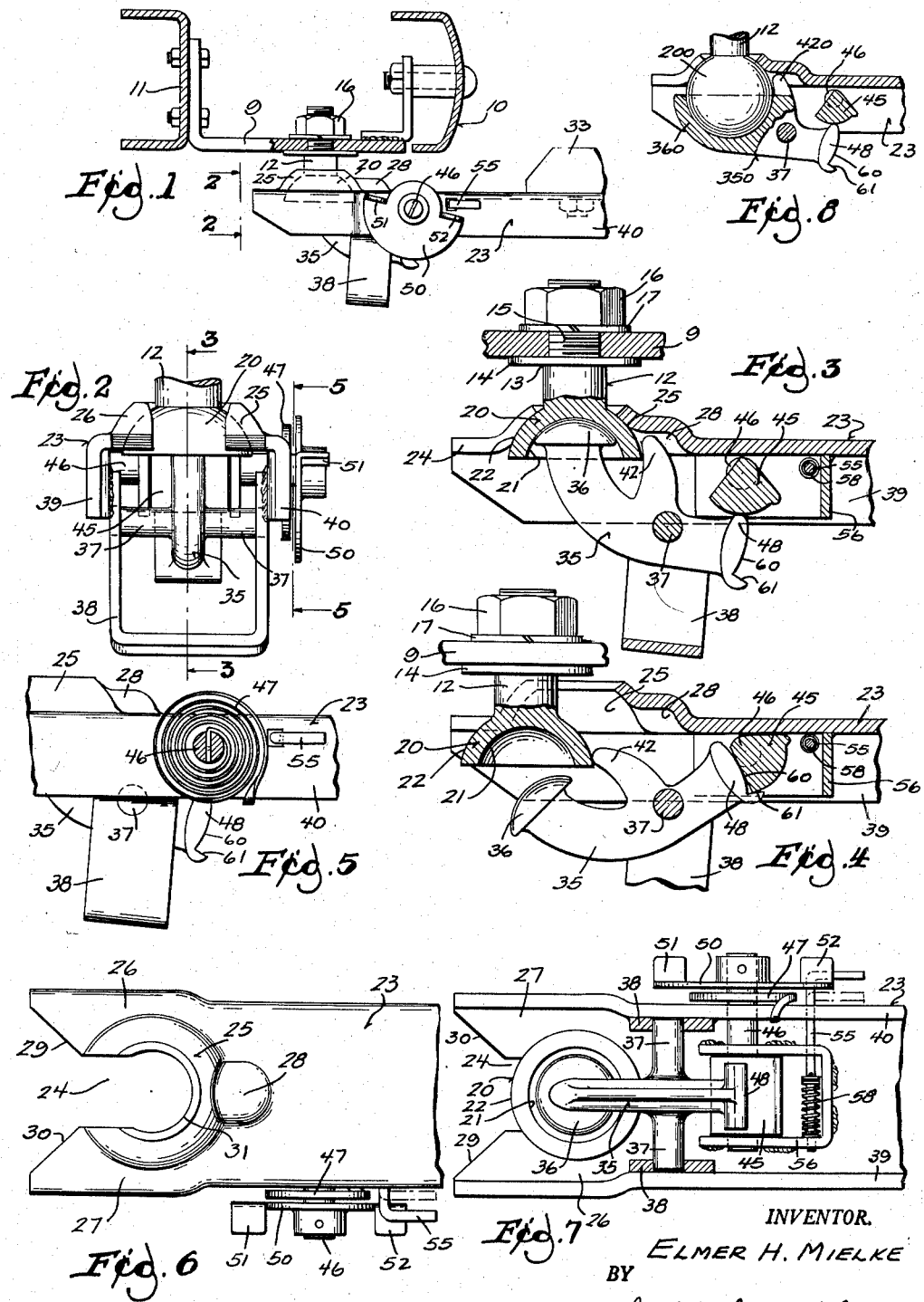

TRAILER HITCH

Elmer H. Mielke, Seymour, Wis.

Application December 12, 1956, Serial No. 627,891

11 Claims. (Cl. 280—508)

This invention relates to a trailer hitch.

The anchor on the towing vehicle comprises a head portion suspended by a neck portion to hang vertically downwardly. The head portion may have the form of a downwardly opening bell or cup or it may have the form of a generally spherical ball. In either case, it is engaged by a bifurcated end of a coupling arm which has a retainer that may be either convex or concave to be complementary to the head of the anchoring device and is pivotally movable to and from engagement with such device. In the retracted position, there is freedom of relative movement between the bifurcated coupling arm and the anchorage head and neck secured to the towing vehicle. In the course of such movement, those portions of the arm which are separated by the bifurcated slot ride on the head of the anchorage to support the arm. When the neck portion of the anchorage is engaged in the slot in the normal towing position, the retainer is caused, by virtue of such engagement of the head, to pivot upwardly respecting the arm into full retaining engagement with the head, thus locking the parts together.

Detent means is provided to prevent accidental release of the retainer from such locking engagement. The detent means is desirably spring actuated, requiring the detent means and retainer to be cocked in a preset position from which the parts are automatically released as a result of relative movement between the anchor and the coupling arm toward full coupling position.

The coupling is operated with unusual ease because of the fact that after it is preset and the parts are moved into engagement, the arm is mechanically supported until full engagement occurs, at which time locking of the parts is automatically effected. Thus, the device can be operated without requiring that the operator have his hands in sufficient proximity to the hitch to incur any possibility of accidental injury.

In the drawings:

Fig. 1 is a view of the hitch in side elevation, portions of the towing vehicle being shown in section, and only a portion of the trailer tongue being illustrated.

Fig. 2 is a view on an enlarged scale showing the hitch in front elevation as viewed on line 2—2 of Fig. 1.

Fig. 3 is a view taken in section on line 3—3 of Fig. 2.

Fig. 4 is a view similar to Fig. 3 showing the parts as they appear when only partially engaged.

Fig. 5 is a view taken in section on line 5—5 of Fig. 2.

Fig. 6 is a plan view of the bifurcated coupling arm, with the retainer omitted.

Fig. 7 is an inverted plan view of the complete bifurcated coupling arm and retainer.

Fig. 8 is a fragmentary detail view showing modified anchorage and retainer parts.

A desirable feature of the invention consists in having the head of the anchorage device depending downwardly from its support on the towing vehicle. As contrasted with the unsightly anchorage devices commonly used for trailer hitches, the head of the present device can be nearly or completely out of sight, notwithstanding which it is extremely effective for the desired towing function and, additionally, provides support for the bifurcated forward end of the hitch arm.

It will be understood that the anchorage device may be connected with any appropriate part of the towing vehicle. Solely by way of exemplification, I have shown the anchorage device mounted on the bracket 9 which supports the bumper 10 at the rear of the cross frame member 11 of the towing vehicle.

The anchorage device, in its preferred form, comprises a shank portion 12 which depends from whatever support is provided therefor on the towing vehicle. In the device illustrated, the shank is shouldered at 13 to engage a washer 14 and has a threaded bolt portion 15 extending through bracket 9 and tightened thereon by a nut 16 which is made secure by a lock washer 17.

At the lower end of the shank portion 12 of the anchor, there is a head 20 which, in the preferred embodiment, has a downwardly spherically concave socket at 21 as shown in Figs. 3 and 4. The outer surface 22 of the head is desirably convex and may be concentric with the wall of the socket 21.

Cooperating with the anchor is a coupling arm 23 having its forward end bifurcated by a slot at 24 just wide enough to receive the neck portion 12 of the anchorage. The slot opens into an annular pocket 25 formed by the upward embossing of the arm 23 and the extensions 26 and 27 of the arm at opposite sides of the communicating slot 24. The embossed pocket is enlarged rearwardly at 28 for reasons hereinafter to be described. The arm extensions 26 and 27 are provided with beveled margins at 29 and 30 which converge rearwardly toward the slot 24 to guide the arm into position with respect to the anchor.

It will be observed that the margin 31 of the embossed pocket 25 is slightly larger in diameter than the width of the communicating slot 24, thus allowing some clearance between this margin and the neck 12 of the anchor to permit of universal movement between the anchor and the hitch arm 23 during operation. The hitch arm 23 is, of course, connected rigidly to the trailer in any appropriate manner as, for example, by bolting it to the trailer tongue 33 (Fig. 1).

For securing the parts in engagement during use, I provide a retainer 35 which is pivoted to the arm 23 and has a head 36 complementary to the head of the anchor, one of the heads being concave and the other convex upon generally complementary radii. While any means of pivoting the retainer to the arm 23 may be employed, I prefer to mount the retainer 35 upon trunnions 37 which are provided with bearings in a U-shaped yoke 38 welded to the side flanges 39 and 40 with which the channel-shaped arm 23 is provided. Upon the trunnions, the retainer lever is oscillatory between the retracted position of Fig. 4 and the position of use in which it appears in Fig. 3. It is provided with a finger at 42 which, in the position of the parts shown in Fig. 3, is received into the enlargement 28 of the embossed pocket 25.

In the retracted position of the retainer shown in Fig. 4, the finger 42 projects into the path upon which the head of the anchor must have relative movement as it enters pocket 25 through slot 24. Thus, upon relative movement between the hitch arm and the anchor in a direction to engage the parts of the hitch for towing purposes, the head 20 of the anchor, by striking the finger 42, positively effects oscillation of the retainer lever 35 to cause its mushroom-shaped head 36 to enter the socket 21 of the anchor head 20, thus forcing the anchor head snugly into the pocket 25 of the hitch arm 23, in which position the hitch arm is connected to the towing anchorage subject to limited universal movement to accommodate such minor displacements as may occur during use on the highway.

It is desirable to lock the parts in their connected position. For this purpose, I provide a detent cam 45 which is mounted on a rockshaft 46 subject to the bias of torsion spring 47 which constantly tends to oscillate the shaft clockwise as viewed in Figs. 3 and 4 toward the locking position in which the cam 45 is shown in Figs. 3 and 5. In the locking position, the cam overlies a portion 48 at the rear end of retainer lever 35, thereby making it impossible for the lever to move counterclockwise from the operative position in which it is illustrated in Fig. 3.

For releasing the detent cam 45, I provide a manually operable handle 50 pinned to the end of the rockshaft 46 upon which the cam 45 is mounted. To facilitate its manipulation, the handle is provided with laterally projecting wings 51 and 52 to be engaged by the operator's thumb and finger. However, as a further safety factor, I provide a manually releasable lock pin 55 mounted in the yoke 56 in which the rockshaft 46 has its bearings and extending through the side flange 40 of the hitch arm 23 into the path of finger piece 52 to preclude oscillation of the rockshaft in a detent releasing direction until the pin 55 is first pushed inwardly against the bias of spring 58 from the full line position to the dotted line position of Figs. 6 and 7.

To exemplify the fact that it is immaterial whether the head of the anchor or the head of the retainer is convex, I have shown a modified organization in Fig. 8 in which the head 200 comprises a ball, the neck portion 12 of the anchor being unchanged. Cooperating with the ball is a retainer 350, the head portion 360 of which is cup-shaped to receive the ball 200. The trunnions 37 upon which the retainer 350 oscillates are the same as above described. The finger 420 on the retainer lever performs a function corresponding to that already described.

In both constructions, the rear end portion 48, which is engaged by the detent cam 45, desirably has a surface at 60 abutted by the side of cam 45 in the retracted position of the parts shown in Fig. 4. The surface 60 may be bounded at its lower margin by a shoulder 61 that limits the retractive oscillation of the retainer lever 35. When the cam 45 has been manually retracted against the bias of its spring 47, and the anchor has been withdrawn from its socket by relative movement to the left as viewed in Fig. 4, the retainer lever will be oscillated counterclockwise to move its rear bearing portion 48 into the path of cam 45, thus retaining the cam in its retracted position as shown in Fig. 4. The disc-like part of holder 50 will, in this position of the parts, cover the locking pin 55 to hold this pin inwardly against the bias of its spring 58.

In effect, the retainer and detent cam and locking pin are cocked, in readiness for the next hitching operation.

When the towing anchor and the hitch arm are again engaged by relative movement of the arm to the left (or the anchor head to the right) as viewed in Figs. 3 and 4, contact between head 20 and finger 42 of the retaining lever will not only effect oscillation of the retaining lever from the position of Fig. 4 to that of Fig. 3, but, in the course of such movement, will effect the release of the detent cam 45 from the position of Fig. 4 to permit it to oscillate over the trailing end 48 of the retaining lever 35, thus locking the complementary concave and convex heads of the retainer and towing anchor. The safety locking pin will then spring out from the dotted line position illustrated in Figs. 6 and 7 to the full line position to which it is biased by spring 58.

It will be evident that the hitch disclosed can be operated with unusual facility, both in engaging and disengaging directions. In the engaging movement, it is a great advantage to have the hitch arm supported on the head 20 of the tractor anchor well in advance of full connection of the parts. It is also very advantageous to have the retainer and the detent and the locking pin all cocked as an incident or prerequisite to the release of the hitch and automatically effective for automatic movement to their respective securing positions as an incident to the re-engagement of the towing head and hitch arm.

It has been found that the device not only operates with unusual facility, but is unusually safe.

I claim:

1. A towing hitch for connecting a towing vehicle and a towed vehicle and comprising the combination with a towing anchor comprising a neck depending downwardly beneath a portion of the towing vehicle and an anchor head at the lower end of the neck and suspended thereby, of a hitch arm connected with the towing vehicle and having a portion provided with a slot of less cross section than the head and sufficiently large to receive the neck, whereby the arm will be suspended from the neck by the head as soon as the neck enters the slot, and a retainer comprising means for locking the head against withdrawal from the slot, the hitch arm remaining suspended by said head from said neck, the arm having its end bifurcated by the slot and being provided with fixed surfaces constituting a socket to which the slot opens, the socket being downwardly concave and having an annular form with a central opening sufficiently large to accommodate some relative universal movement between the arm and neck.

2. The device of claim 1 in which said retainer has a head engageable with the head of the towing anchor in the locked position of the retainer and adapted to lock the anchor head in the socket of the arm, one of said heads being convex and the other complementarily concave, said retainer comprising a lever having a pivotal connection with said arm at a point spaced from the socket.

3. In a trailer hitch, the combination with a towing anchor comprising a generally upright neck and a head suspended thereby and disposed at the lower end of the neck, of a hitch arm provided with a slot opening toward the front end of the arm and of less transverse dimension than the head but sufficiently wide to receive the neck, a retainer in pivotal connection with the arm and having a head complementary to the head of the towing anchor, one of said heads having a recess in which the other is received in one position of the retainer, the retainer being movable upon its pivotal connection with the arm between the said position and a retracted position, the reception of said one head into the other being adapted to preclude relative withdrawal of the towing anchor from the slot of said arm, and a detent means engageable with the retainer in the said position thereof for fixing the retainer in the said position, said detent means comprising a cam mounted for oscillation between two positions, the cam and retainer being formed for interlocking engagement in both of said positions, the interlocking engagement of the cam with the retainer in said first position of the latter being adapted to secure the retainer in said position, and the interlocking engagement of the cam with the retainer in the retracted position of the latter being adapted to hold the retainer impositively in its retracted position.

4. The device of claim 3 in which the interengagement of the cam and the retainer in the retracted position of the latter further maintains the cam in a retracted position, the cam being subject to bias toward re-engagement with the retainer when the latter reaches the said first mentioned position, and the retainer being provided with means in the path of relative movement of the anchorage head into the slot for displacing the retainer toward the said first mentioned position from its retracted position.

5. The device of claim 4 in further combination with a manually releasable locking pin in the path of movement of a connection with which such cam is provided, said pin normally precluding movement of the cam from the position in which it restrains the retainer in its said first mentioned position.

6. A trailer hitch comprising the combination with a headed towing anchor provided with a neck, of a hitch arm having a neck-receiving slot narrower than the anchor and provided with means for retaining the anchor neck in the slot, said means comprising a retaining lever having a head complementary to the head of the towing anchor, one of said heads having a recess into which the other is receivable in one position of said lever, said lever being provided with releasable means for retaining it in said position and being retractable from said position for accommodating relative movement of the trailer anchor neck into and from said slot, said towing anchor head comprising a bell-shaped member having a concave recess, the lever head being convex with a terminal surface complementary to the interior of the recess.

7. A trailer hitch comprising the combination with a headed towing anchor provided with a neck, of a hitch arm having a neck-receiving slot narrower than the anchor and provided with means for retaining the anchor neck in the slot, said means comprising a retaining lever having a head complementary to the head of the towing anchor, one of said heads having a recess into which the other is receivable in one position of said lever, said lever being provided with releasable means for retaining it in said position and being retractable from said position for accommodating relative movement of the trailer anchor neck into and from said slot, said arm having a concave socket offset upwardly from the slot and into which the slot opens, the towing anchor head having a convex surface complementary to the surface of said socket, said socket being spaced inwardly from the end of the arm, whereby relative movement of the towing anchor head is required to occur first in a direction longitudinally of the arm and then in a direction axially of its neck in entering the socket.

8. The device of claim 7 in which the arm has portions beveled at the outer ends of the arm in a direction convergently into the slot for guiding the neck of the towing anchor into the slot.

9. A trailer hitch comprising the combination with a towing anchor provided with a neck and a head and means for supporting the towing anchor with its neck in a generally upright position and its head depending therefrom, of a hitch arm bifurcated to provide terminal extensions and an intervening slot, the arm being provided with a downwardly concave pocket into which the slot opens, the slot having a width sufficient to receive the neck and less than the width of the head, whereby the arm will be supported on the head while the neck transverses the slot in the course of relative movement between the arm and towing anchor, the head being receivable into the recess of said arm, and means for locking the head in said recess and comprising a retaining lever pivotally connected with the arm for movement between retracted and advanced positions, said lever having a head complementary to the towing anchor head and engaged therewith in the advanced position of the lever and withdrawn therefrom in the retracted position of the lever, and releasable detent means for securing the lever in its advanced position, said detent means comprising a stop member having a handle and provided with a biasing spring acting upon it in a direction to urge it into stop position respecting said lever, the lever being subject to gravity bias toward its retracted position and being adapted in said retracted position to engage said stop means for holding the stop means against its bias, the lever having a finger in the path of relative movement of the anchorage head into the recess of said arm, said finger being adapted to actuate the lever toward the advanced position thereof to engage its head with the anchorage head and to release the stop means for spring biased movement into lever securing position.

10. A towing hitch comprising the combination with a towing anchor having a depending neck and a head suspended thereby, of a bifurcated hitch arm having end portions spaced apart by a slot narrower than the head but sufficiently wide to receive the neck whereby the hitch arm will be supported on said head by its spaced end portions as soon as the neck enters the slot, a head retainer, a lever to which the retainer is connected, and means on which said lever is pivotally movable between a retracted position in which the head retainer is spaced below the hitch arm sufficiently to permit free entry of the head between the arm and head retainer and an advanced position in which the retainer interlocks with said head to secure the head to the hitch arm, said lever being provided with an actuating finger engaged by the head in the course of its entry between the arm and retainer whereby to automatically move said retainer from its retracted to its advanced position.

11. The device of claim 10 in further combination with detent means for releasably locking the retainer in its advanced position.

References Cited in the file of this patent
UNITED STATES PATENTS

| 2,179,432 | Schroeder | Nov. 7, 1939 |
| 2,230,567 | Henderson | Feb. 4, 1941 |

FOREIGN PATENTS

| 522,540 | France | Apr. 1, 1921 |